March 8, 1966 V. A. EHRESMAN 3,239,680

PARAMETRON PHASE REFERENCE

Filed June 30, 1961

INVENTOR
*VIRGIL A. EHRESMAN*

BY Herbert F. Sonnemeyer

ATTORNEY

United States Patent Office 3,239,680

Patented Mar. 8, 1966

3,239,680
PARAMETRON PHASE REFERENCE

Virgil A. Ehresman, Richfield, Minn., assignor to Sperry Rand Corporation, New York, N.Y., a corporation of Delaware Filed June 30, 1961, Ser. No. 121,049
6 Claims. (Cl. 307—88)

This invention relates in general to computing apparatus and in particular to an electronic data processing system utilizing parametrons as computing elements.

This invention is primarily concerned with electronic data processing systems that utilize parametrons which are a special case of parametric amplifiers and which has been defined as resonant circuits in which either the inductance or capacitance is made to vary periodically at one-half the driving frequency. They are used as a digital computer element in which the phases of oscillation represent the binary digits "1" or "0." A parametron element is essentially a resonant circuit with a reactive element whose reactance varies periodically at a frequency F and which generates a parametric oscillation at the subharmonic frequency $F/2$. In practice the periodic variation is accomplished by applying an exciting current of frequency F to a non-linear reactor such as a ferrite-core or a Permalloy film or to a non-linear capacitor such as the barrier capacitance of semiconductor junctions. The subharmonic parametric oscillation thus generated has the remarkable property that the oscillation will be stable in either of two phases which differ by $\pi$ radians with respect to each other. Utilizing this fact, a parametron represents and stores one binary digit, "0" or "1," by the choice between these two signal phases of 0 or $\pi$ radians. Under certain resonant conditions the oscillation generated in the parametron is "soft" that is, it is easily self-started from any small initial amplitude. In this case the choice between two stable states of the oscillation having a large amplitude can be made by controlling the phases of a small initial oscillation voltage. This fact may be regarded as amplification and its mechanism may be best understood as super-regeneration with the phase of oscillation quantized to two states. In order to make effective use of this characteristic, quenching means are provided in parametron circuits to interrupt parametric oscillation. Besides the memory and amplifying action, parametrons can also perform various logical operations based on a majority principle by applying the algebraic sum of oscillation voltages of an odd number of parametrons to another parametron in which the algebraic sum voltage works as the small initial oscillation voltage.

The application of parametric oscillations to amplifying electrical signals is not a new idea. In 1932 Patent No. 1,884,844 granted to E. Peterson disclosed an idea for an amplifier based on the same principles as the parametric amplifier. In 1954 J. Von Neumann in Patent No. 2,815,488 and Eiichi Goto in a paper entitled "The Parametron, a New Circuit Component Using Non-Linear Reactors" a paper of the Electronic Computer Technical Committee, IECEJ, independently proposed the use of phase-locked, subharmonic, parametric oscillators as logical elements for computers. Since this time considerable developmental effort has been spent in the application of various circuit elements utilizing the principles of the parametron. With the advent of magnetic thin films as practical memory devices for high speed logical operations, the parametron has taken new interest in the computer field. Schauer et al., in an article entitled "Some Applications of Magnetic Film Parametrons as Logical Devices" in September 1960 IRE Transactions on Electronic Computers discloses a practical parametron using magnetic thin films. Patent application titled "Magnetic Film Parametric Devices" filed October 11, 1960, Serial No. 61,981 and now U.S. Patent No. 3,173,108 of Davis et al., and assigned to the assignee of this present application, discloses an efficient utilization of a thin film magnetic device as a logical element for an electronic data processing system using a parametron as a logical element.

The primary purpose of this invention is to provide an electronic data processing system in which one signal source of a reference frequency shall be the frequency and phase standard for all parametrons utilized as logical elements.

Another object of this invention is to provide an electronic data processing system which utilizes a parametron as a logical element wherein the parametron pump signal is developed by doubling the reference signal.

Another object of this invention is to provide an electronic data processing system wherein the pump frequency and reference frequency originate at a common source making small frequency changes in the reference signal inconsequential.

Another object of this invention is to provide an electronic data processing system whereby the pump frequency reference phase relationship of a parametron logical system is a function of the double frequency of the reference signal and not a function of the tuning of a parametron output tank.

A still further object of this invention is to provide an electronic data processing system using parametron computing elements wherein the frequency of the distribution system's signal is determined by an electronic circuit and not by the tuning of the output tank of a continuously running parametron.

These and other more detailed and specific objectives will be disclosed in the course of the following specification, reference being had to the accompanied drawing in which.

Figure 1:
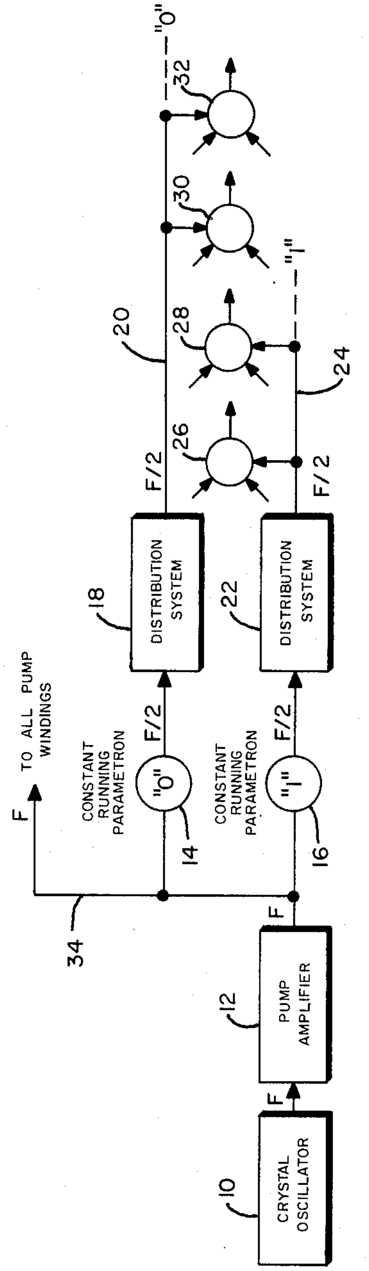
Fig 1 PRIOR ART
FIG. 1 is a block diagram of an electronic data processing system using parametrons as logical elements wherein the distribution signal frequency is a function of the tuning of an output tank of a continuously running parametron.

The illustrated embodiment of FIG. 1 discloses a prior art utilization of parametron logical elements as utilized in an electronic data processing system wherein the distribution system signal frequency is produced by the tuning of a parametron output tank. As disclosed in the above referred to article by E. Goto, electronic data processing systems of this type utilize distribution systems that provide logical signals to a large number of parametron devices coupled in parallel. It has been found that the variation in loading under varying logical manipulative conditions may cause a variation in the parametric oscillatory characteristic of a parametron circuit. A common solution to this problem is to limit the number of outputs from each distribution system so as to minimize the variation in loading. However, this system requires a plurality of parametrons of the continuously operating variety to provide a plurality of distribution systems. It has been found, and it is disclosed by this invention, that this problem can be overcome by the utilization of a system wherein the master oscillator drives the pump amplifying system and the distribution systems in parallel and that utilizes electronic circuitry for amplifying and generating purposes. As the parametron is a phase sensitive device and as the phase of a parametron output may vary with output loading, the illustrated embodiment of FIG. 2 eliminates the problem of phase variation encountered with the use of parallel distribution systems utilizing constant running parametrons as generators of the logical signals.

The prior art electronic data processing system illustrated in FIG. 1 utilizes a conventional oscillator, such as crystal oscillator 10, which is coupled to pump amplifier 12. Pump amplifier 12 is coupled to constant running parametron 14 which generates a phase signal equivalent to a logical "0" and to constant running parametron 16 which generates a phase signal equivalent to a logical "1." Parametron 14 provides a phase-locked reference signal equivalent to a logical "0" to distribution system 18 which is essentially a constant current, constant voltage source for distribution line 20. Distribution line 20 provides logical "0" inputs to a plurality of parametron devices such as parametrons 30 and 32. Parametron 16 provides a phase-locked reference signal equivalent to a logical "1" to distribution system 22 which, as with distribution system 18, is essentially a constant current, constant voltage source. Distribution system 22 in turn provides a phase-locked reference signal equivalent to a logical 1 to distribution line 24 which in turn provides logical 1 signals to a plurality of parametron devices such as parametrons 26 and 28. Additionally, line 34 couples pump amplifier 12 to all pump windings of the parametrons of the electronic data processing system such as parametrons 26, 28, 30, and 32. It is apparent that the phase relationship of the signals on distribution lines 20 and 24 are dependent upon stable, in-phase operation of constant running parametrons 14 and 16. Wide variations of loading conditions during varying logical operations may cause varying phase relationships of such signals which may cause false logical signal outputs from parametrons 26, 28, 30 or 32. The invention disclosed by the illustrated embodiment of FIG. 2 eliminates the possibility of out-of-phase logical signals being conducted to the parametrons that are coupled to the distribution systems.

Figure 2:
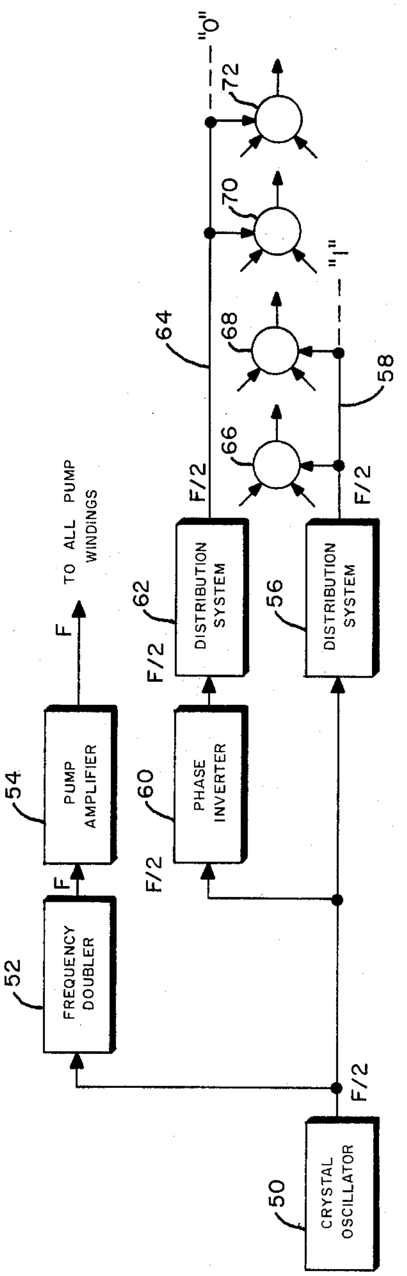
FIG. 2 is a block diagram of an exemplary embodiment of this invention wherein there is disclosed an electronic data processing system utilizing parametrons as logical elements wherein the distribution signal frequency is a function of an electronic oscillator.

An exemplary embodiment of this invention is illustrated in FIG. 2. In this embodiment there is shown a conventional oscillator, such as crystal oscillator 50, which generates a reference signal of frequency $F/2$ in contrast to crystal oscillator 10 of FIG. 1 which generates a reference signal of frequency F. Crystal oscillator 50 is coupled to distribution system 56 which may be similar to distribution systems 18 and 22 of FIG. 1 and which similarly is essentially a power source of constant current and constant voltage, the output of which is also of a frequency $F/2$. Distribution system 56 is coupled to distribution line 58 which provides a logical "1" signal to a plurality of parametron devices such as parametrons 66 and 68. Crystal oscillator 50 is also coupled to phase inverter 60 which provides a logical "0" output signal of frequency $F/2$ to distribution system 62 which may be similar to distribution system 56. Distribution system 62 is coupled to distribution line 64 which provides a logical "0" signal to a plurality of parametron devices such as parametrons 70 and 72. Unlike the prior art system of FIG. 1, the output of crystal oscillator 50 is coupled to a frequency doubler 52 which provides an output signal of frequency F. This signal is fed into a pump amplifier 54 whose output frequency is of a frequency F, and which output is coupled to all pump windings of all parametrons such as parametrons 66, 68, 70 and 72. It is apparent upon comparison of the electronic data processing system of FIG. 1 to that of FIG. 2 that the exemplary embodiment of this invention disclosed in FIG. 2 utilizes a frequency doubler 52 in place of parametrons 14 and 16 which are of the constant running variety and which feed directly into their respective distribution systems. With the exemplary embodiment of this invention of FIG. 2, it is consequently possible to use less complicated distributional systems in place of distributional systems 18 and 22 of FIG. 1, as the distribution systems of FIG. 1 must be designed so as to present a minimum input impedance variation to the parametron which provides the phase-locked frequency input to distribution lines 20 and 24. If the distribution systems of FIG. 1 are of such a design as to present a large variation of input impedance to the parametron providing the input signal, the impedance variation being fed back into the parametron output tuning tank may effect the phase-locking output signal of the parametron. Consequently, with the system of FIG. 1, it is essential that a distribution system having a substantially constant input impedance be utilized. Conversely, with he electronic data processing system of FIG. 2, the distribution system may be of a less rigid design providing a more economical system, for here a variation in the input impedance of the distribution system has substantially no effect upon the phase of the phase-locking signal fed to the logical parametron elements.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. In an electronic data processing system having a plurality of electric resonators, each of said resonators having at least one reactor powered by a pump winding, the reactance of which is made to vary at a frequency F whereby an output digital signal of frequency $F/2$ is produced by each of said resonators, said digital signals in said digital system being represented by the phase difference in said signal of frequency $F/2$ of said resonators comprising a source of a reference signal of frequency $F/2$ coupled in parallel to a source of driving power for the pump windings of said resonators and to at least two distribution systems, each of said two systems propagating a unique digital signal of frequency $F/2$, said source of pump power including a frequency doubler of an output signal of frequency F and a pump amplifier; one of said distribution systems including a source of a substantially constant current and constant voltage level of a first digital signal of frequency $F/2$ coupled to certain ones of said resonators, another of said distribution systems including a second source of a substantially constant current and constant voltage level and an inverter generating a second digital signal of frequency $F/2$ which is coupled to other ones of said resonators.

2. In an electronic data processing system having a plurality of electric resonators, each of said resonators having at least one reactor powered by a pump winding the reactance of which is made to vary at a frequency F whereby an output digital signal of frequency $F/2$ is produced by each of said resonators, said digital signals in said system being represented by a phase difference in said digital signals of frequency $F/2$ of said resonators, comprising: a source of a reference signal of frequency $F/2$ coupled in parallel to a source of driving power of output signal of frequency F driving the pump windings of said resonators and to a plurality of distribution systems; each distribution system propagating one of said digital signals to certain ones of said resonators.

3. In an electronic data processing system having a plurality of electric resonators, each of said resonators having at least one reactor powered by a pump winding the reactance of which is made to vary at a frequency F whereby an output digital signal of frequency $F/2$ is produced by each of said resonators, said digital signals in said system being represented by the phase difference in said digital signals of frequency $F/2$ of said resonators, comprising: a source of a reference signal of frequency $F/2$ coupled in parallel to a source of driving power of output signal frequency F driving the pump windings of said resonators and to at least two distribution systems; each distribution system propagating one of said digital signals, a first of said distribution systems coupling a first digital signal to certain ones of said resonators; a second of said distribution systems coupling a second digital signal to certain ones of said resonators.

4. In an electronic data processing system having a plurality of electric resonators, each of said resonators having at least one reactor powered by a pump winding, the reactance of which is made to vary at a frequency F whereby an output digital signal of frequency $F/2$ is produced by each of said resonators, said digital signals in said system being represented by the phase difference in said digital signals of frequency $F/2$ of said resonators comprising: a source of a reference signal of oscillation of frequency $F/2$ coupled in parallel to at least one source of driving power for the pump windings of said resonators and to at least two distribution systems; each distribution system propagating at least one of two unique digital signals; said source of pump power including a frequency doubler of output oscillation of frequency F and a pump amplifier; means coupling said source of pump power to said pump windings; means coupling a first of said distribution systems of a first digital signal to certain ones of said resonators; a second of said distribution systems including a phase inverter generating a second digital signal; and means coupling said second digital signal to certain ones of said resonators.

5. In an electronic data processing system having a plurality of electric resonators, each of said resonators having at least one reactor powered by a pump winding, the reactance of which is made to vary at a frequency F whereby an output digital signal of frequency $F/2$ is produced by each of said resonators, said digital signals in said system being represented by $\pi$ radians phase difference in said digital signals of frequency of $F/2$ of said resonators comprising: a source of a reference signal of frequency $F/2$ coupled in parallel to a source of driving power for the pump windings of said resonators and to at least two distribution systems; each distribution system propagating a digital signal; said source of pump power including a frequency doubler of an output signal of frequency F and a pump amplifier; a first of said distribution systems coupling a first digital signal to certain ones of said resonators; a second of said distribution systems including a phase inverter which generates a second digital signal; and means coupling said second digital signal to certain ones of said resonators.

6. In an electronic data processing system having a plurality of electric resonators, each of said resonators having at least one reactor powered by a pump winding, the reactance of which is made to vary at a frequency F whereby an output digital signal of frequency $F/2$ is produced by each of said resonators, said digital signals in said system being represented by $\pi$ radians phase difference in said digital signals of frequency $F/2$ of said resonators comprising: a source of a reference signal of oscillation of frequency $F/2$ coupled in parallel to at least one source of driving power for the pump windings of said resonators, and to at least two distribution systems; each distribution system propagating a unique digital signal; said source of pump power including a frequency doubler of an output signal of frequency F and a pump amplifier; means coupling said source of pump power to said pump windings; means coupling a first of said distribution systems of a first digital signal to certain ones of said resonators; a second of said distribution systems including a phase inverter generating a second digital signal; and means coupling said second digital signal to other ones of said resonators.

References Cited by the Examiner

UNITED STATES PATENTS

| | | | |
|---|---|---|---|
| 2,815,488 | 12/1957 | Von Neumann | 307—88 |
| 2,928,053 | 3/1960 | Kiyasu et al. | 307—88 |
| 2,948,818 | 8/1960 | Goto | 307—88 |

IRVING L. SRAGOW, *Primary Examiner.*

R. R. HUBBARD, H. D. VOLK, *Assistant Examiners.*

UNITED STATES PATENT OFFICE

CERTIFICATE OF CORRECTION

Patent No. 3,239,680 March 8, 1966

Virgil A. Ehresman

It is hereby certified that error appears in the above numbered patent requiring correction and that the said Letters Patent should read as corrected below.

Column 4, line 28, for "said digital system" read -- said system --; line 29, for "said signal" read -- said digital signal --.

Signed and sealed this 19th day of September 1967.

(SEAL)
Attest:

ERNEST W. SWIDER
Attesting Officer

EDWARD J. BRENNER
Commissioner of Patents